US010514468B2

United States Patent
Xia et al.

(10) Patent No.: US 10,514,468 B2
(45) Date of Patent: Dec. 24, 2019

(54) VEHICLE POSITIONING METHOD AND SYSTEM

(71) Applicant: BEIJING MOBIKE TECHNOLOGY CO., LTD., Beijing (CN)

(72) Inventors: Yiping Xia, Beijing (CN); Xinwu Liu, Beijing (CN); Kun Yang, Beijing (CN)

(73) Assignee: BEIJING MOBIKE TECHNOLOGY CO., LTD., Beijing (CN)

( * ) Notice: Subject to any disclaimer, the term of this patent is extended or adjusted under 35 U.S.C. 154(b) by 169 days.

(21) Appl. No.: 15/726,964

(22) Filed: Oct. 6, 2017

(65) Prior Publication Data
US 2018/0100933 A1    Apr. 12, 2018

(30) Foreign Application Priority Data
Oct. 9, 2016    (CN) .......................... 2016 1 0881188

(51) Int. Cl.
| | |
|---|---|
| *G01S 19/47* | (2010.01) |
| *G01S 19/14* | (2010.01) |
| *B62H 5/00* | (2006.01) |
| *G01S 19/34* | (2010.01) |

(52) U.S. Cl.
CPC ............... *G01S 19/47* (2013.01); *B62H 5/00* (2013.01); *G01S 19/14* (2013.01); *G01S 19/34* (2013.01)

(58) Field of Classification Search
CPC .......... G01S 19/47; G01S 19/34; G01S 19/14; B62H 5/00
See application file for complete search history.

(56) References Cited

U.S. PATENT DOCUMENTS

| | | | | |
|---|---|---|---|---|
| 8,130,678 B2* | 3/2012 | Lee | .................... | H04L 41/0893 370/255 |
| 9,157,742 B1* | 10/2015 | Fahrner | .................. | G01C 21/00 |
| 9,194,955 B1* | 11/2015 | Fahrner | .................. | G01S 19/16 |
| 9,569,966 B2* | 2/2017 | Bobbitt | .................. | G08G 1/127 |
| 2002/0174077 A1* | 11/2002 | Yui | ...................... | G06C 20/127 705/400 |
| 2005/0203677 A1* | 9/2005 | Auger | .................... | G01C 21/34 701/16 |
| 2009/0181826 A1* | 7/2009 | Turner | .................... | B62M 6/50 482/4 |
| 2010/0228405 A1* | 9/2010 | Morgal | .................. | B62H 3/02 701/2 |
| 2010/0313614 A1* | 12/2010 | Rzepecki | ............... | B62H 5/145 70/233 |
| 2011/0307394 A1* | 12/2011 | Rzepecki | ............... | G06Q 30/00 705/307 |
| 2012/0196631 A1* | 8/2012 | Fajstrup Axelsen | ... | G06Q 20/32 455/466 |
| 2013/0150028 A1* | 6/2013 | Akins | .................... | H04W 4/02 455/427 |

(Continued)

*Primary Examiner* — Mussa A Shaawat
(74) *Attorney, Agent, or Firm* — Alston & Bird LLP

(57) ABSTRACT

A vehicle positioning method and system are provided. The vehicle positioning method comprises: receiving a first sampling signal from a mobile communication device and a second sampling signal from a vehicle; selecting a target sampling signal from the first and second sampling signals; and determining a position of the vehicle based on the target sampling signal. The vehicle positioning method and system can improve the vehicle positioning accuracy while reducing battery consumption.

9 Claims, 5 Drawing Sheets

(56) References Cited

U.S. PATENT DOCUMENTS

| | | | | |
|---|---|---|---|---|
| 2014/0266588 A1* | 9/2014 | Majzoobi | ............ | E05B 47/0012 |
| | | | | 340/5.61 |
| 2014/0324340 A1* | 10/2014 | Nishida | .................. | G01C 21/26 |
| | | | | 701/519 |
| 2015/0074004 A1* | 3/2015 | Song | ................... | G07F 17/0057 |
| | | | | 705/307 |
| 2018/0014351 A1* | 1/2018 | Coutinho | .............. | H04W 84/06 |

* cited by examiner

VEHICLE POSITIONING METHOD AND SYSTEM

CROSS REFERENCE TO RELATED APPLICATIONS

This application claims priority to Chinese Patent Application No. 201610881188.4, filed on Oct. 9, 2016, the contents of which as are hereby incorporated by reference in their entirety.

BACKGROUND

Related Field

The present invention relates to a vehicle positioning method and system.

Description of Related Art

At present, environmental pollution is becoming heavy. As an environmental pollution source, vehicle exhaust emissions in big cities have raised public concern. To solve this problem, on one hand, some countries have restricted purchasing or running of vehicles to reduce the vehicle ownership rate and the vehicle utilization rate. On the other hand, green travel is greatly encouraged.

Bicycle travel, as one of green travel means, is a choice that most people make in a case of short distances. Undoubtedly, bicycle travel is very convenient for cyclists if their starting and destination points are relatively fixed. However, for people who have to change their workplaces frequently, such as salesmen, or tourists who travel in other cities, it is almost impossible for them to go out by their own bicycles. Therefore, a bicycle rental industry has come into being.

At present, a common form of bicycle rental is that generally, multiple rental points are set fixedly, and bicycle rental and return are implemented at the relatively closest rental points. However, there is a problem that the bicycle rental and return are greatly restricted as the number of the set rental points is relatively limited. Thus, in order to facilitate bicycle rental for users, a new rental system has come into being. In this new rental system, there is no fixed rental point. When a user finishes using a bicycle, he/she can arbitrarily park the bicycle anywhere in an area permitted by the local regulations. When a next user needs to use a bicycle, he/she can search for the nearest bicycle through a portable device such as a mobile phone, and then rent the bicycle via electronic payment, etc. As a bicycle is small in size, accurate positioning of the bicycle is required in this system.

In addition, in big cities, the theft rate of bicycles is very high. So, in order to successfully find a stolen bicycle, there is an urgent need for accurate positioning of the bicycles.

Therefore, in this bicycle rental system, each bicycle is equipped with a GPS and is driven by a battery carried by the bicycle itself, so that the bicycle periodically samples its position and reports the position to a backend server in the system, and the backend server can monitor positions of the bicycle based on sampling time stamps and sampling points. However, in these bicycles, the battery only plays an auxiliary role, so the battery capacity is limited, and the bicycle needs to recover energy during riding to charge the battery. Therefore, in design, battery consumption is required to be reduced by all means, including reducing a GPS sampling frequency.

However, if the GPS sampling frequency is reduced, it means that the positioning accuracy is reduced, which in turn contradicts the need for accurate positioning as described above. Therefore, how to reduce the battery consumption on the premise of improving the positioning accuracy has become an urgent problem to be solved.

BRIEF SUMMARY

The present invention is developed to solve the above problems, and aims to provide a vehicle positioning method and system which can improve the vehicle positioning accuracy while reducing battery consumption.

According to the first aspect of the present invention, there is provided a vehicle positioning method applied to a vehicle positioning system which comprises a mobile communication device, a vehicle and a backend server, the method being executed by the backend server and comprising: receiving a first sampling signal from the mobile communication device and a second sampling signal from the vehicle, the first sampling signal including a sampling position and a corresponding sampling time stamp sampled at a first sampling interval, and the second sampling signal including a sampling position and a corresponding sampling time stamp sampled at a second sampling interval; selecting a target sampling signal from the first and second sampling signals; and determining a position of the vehicle based on the target sampling signal.

Optionally, selecting the target sampling signal comprises selecting a sampling signal corresponding to a smaller sampling interval in the first and second sampling intervals as the target sampling signal; and determining the position of the vehicle comprises determining the sampling position corresponding to the last sampling time stamp in the target sampling signals as the position of the vehicle.

Optionally, the method further comprises: receiving a locking signal including a locking time from the vehicle, wherein selecting the target sampling signal comprises: calculating a first time difference between the locking time and the last sampling time stamp in the first sampling signals; when determining that the first time difference is not greater than a preset time, selecting the first sampling signal as the target sampling signal, otherwise, selecting the second sampling signal as the target sampling signal; and determining the position of the vehicle comprises determining the sampling position corresponding to the last sampling time stamp in the target sampling signals as the position of the vehicle.

Optionally, the preset time is the first sampling interval.

Optionally, the method further comprises: detecting and acquiring an average speed and a movement direction of the vehicle, and/or receiving an average speed and a movement direction of the vehicle sent by the mobile communication device or the vehicle; and based on the average speed and the movement direction of the vehicle, compensating for the position of the vehicle to obtain a final position thereof.

Optionally, compensating for the position of the vehicle to obtain a final position thereof comprises: when the target sampling signal is the first sampling signal, calculating a product of the first time difference and the average speed to obtain a movement distance, and taking a position obtained by moving the sampling position corresponding to the last sampling time stamp in the first sampling signals by the movement distance in the movement direction, as the final position of the vehicle; when the target sampling signal is the second sampling signal, calculating and acquiring a second time difference between the locking time and the last sampling time stamp in the second sampling signals, calculating a product of the second time difference and the average speed to obtain a movement distance, and taking a position obtained by moving the sampling position corresponding to the last sampling time stamp in the second sampling signals by the movement distance in the movement direction, as the final position of the vehicle.

Optionally, the method further comprises: generating an alarm signal, and/or receiving an alarm signal sent by the mobile communication device or the vehicle, wherein selecting the target sampling signal comprises selecting the second sampling signal as the target sampling signal; and determining the position of the vehicle comprises determining the sampling position corresponding to the last sampling time stamp in the second sampling signals as the position of the vehicle.

According to the second aspect of the present invention, there is provided a vehicle positioning method applied to a vehicle positioning system which comprises a mobile communication device, a vehicle and a backend server, the method being executed by the mobile communication device and comprising: sampling a sampling position and a corresponding sampling time stamp at a first sampling interval; and sending a first sampling signal including the sampling position and the corresponding sampling time stamp to the backend server.

Optionally, when a user's trip ends, the step of sampling the sampling position and the corresponding sampling time stamp at the first sampling interval is stopped.

Optionally, the method further comprises: detecting and acquiring an average speed and a movement direction of the vehicle, and sending the average speed and the movement direction of the vehicle to the backend server; and/or generating an alarm signal, and sending the alarm signal to the backend server.

According to the third aspect of the present invention, there is provided a vehicle positioning method applied to a vehicle positioning system which comprises a mobile communication device, a vehicle and a backend server, the method being executed by the vehicle and comprising: sampling a sampling position and a corresponding sampling time stamp at a second sampling interval; and sending a second sampling signal including the sampling position and the corresponding sampling time stamp to the backend server.

Optionally, the method further comprises: when a user's trip ends, stopping the step of sampling the sampling position and the corresponding sampling time stamp at the second sampling interval; and locking the vehicle, and sending to the backend server a locking signal including a locking time.

Optionally, the method further comprises: detecting and acquiring an average speed and a movement direction of the vehicle, and sending the average speed and the movement direction of the vehicle to the backend server; and/or generating an alarm signal, and sending the alarm signal to the backend server.

According to the fourth aspect of the present invention, there is provided a backend server for executing a vehicle positioning method applied to a vehicle positioning system. The backend server comprises: a communication unit configured for receiving a first sampling signal from the mobile communication device and a second sampling signal from the vehicle, the first sampling signal including a sampling position and a corresponding sampling time stamp sampled at a first sampling interval, and the second sampling signal including a sampling position and a corresponding sampling time stamp sampled at a second sampling interval; a signal selection unit configured for selecting a target sampling signal from the first and second sampling signals; and a vehicle positioning unit configured for determining a position of the vehicle based on the target sampling signal.

Optionally, the signal selection unit is configured for selecting a sampling signal corresponding to a smaller sampling interval in the first and second sampling intervals as the target sampling signal; and the vehicle positioning unit is configured for determining the sampling position corresponding to the last sampling time stamp in the target sampling signals as the position of the vehicle.

Optionally, the communication unit is further configured for receiving a locking signal including a locking time from the vehicle. The backend server further comprises: a calculation unit configured for calculating a first time difference between the locking time and the last sampling time stamp in the first sampling signals. The signal selection unit is configured for, when determining that the first time difference is not greater than a preset time, selecting the first sampling signal as the target sampling signal, otherwise, selecting the second sampling signal as the target sampling signal. The vehicle positioning unit is configured for determining the sampling position corresponding to the last sampling time stamp in the target sampling signals as the position of the vehicle.

Optionally, the backend server further comprises: a vehicle movement detection unit configured for detecting and acquiring an average speed and a movement direction of the vehicle, and/or the communication unit is configured for receiving an average speed and a movement direction of the vehicle sent by the mobile communication device or the vehicle; and the vehicle positioning unit is configured for, based on the average speed and the movement direction of the vehicle, compensating for the position of the vehicle to obtain a final position thereof.

Optionally, when the target sampling signal is the first sampling signal, the vehicle positioning unit is configured for: calculating a product of the first time difference and the average speed to obtain a movement distance, and taking a position obtained by moving the sampling position corresponding to the last sampling time stamp in the first sampling signals by the movement distance in the movement direction, as the final position of the vehicle. When the target sampling signal is the second sampling signal, the calculation unit is configured for calculating and acquiring a second time difference between the locking time and the last sampling time stamp in the second sampling signals; and the vehicle positioning unit is configured for: calculating a product of the second time difference and the average speed to obtain a movement distance, and taking a position obtained by moving the sampling position corresponding to the last sampling time stamp in the second sampling signals by the movement distance in the movement direction, as the final position of the vehicle.

Optionally, the backend server further comprises: an alarm unit configured for generating an alarm signal, and/or the communication unit is further configured for receiving an alarm signal sent by the mobile communication device or the vehicle. The signal selection unit is further configured for selecting the second sampling signal as the target sampling signal; and the vehicle positioning unit is configured for determining the sampling position corresponding to the last sampling time stamp in the second sampling signals as the position of the vehicle.

According to the fifth aspect of the present invention, there is provided a mobile communication device for executing a vehicle positioning method applied to a vehicle positioning system. The mobile communication device comprises: a first position sampling module configured for sampling a sampling position and a corresponding sampling time stamp at a first sampling interval; and a communication unit configured for sending a first sampling signal including the sampling position and the corresponding sampling time stamp to a backend server.

Optionally, the first position sampling module is further configured for: when a user's trip ends, stopping the step of sampling the sampling position and the corresponding sampling time stamp at the first sampling interval.

Optionally, the mobile communication device further comprises: a vehicle movement detection unit configured for detecting and acquiring an average speed and a movement direction of a vehicle; and/or an alarm unit configured for generating an alarm signal and sending the alarm signal to a backend server.

According to the sixth aspect of the present invention, there is provided a vehicle for executing a vehicle positioning method applied to a vehicle positioning system. The vehicle comprises: a second position sampling module configured for sampling a sampling position and a corresponding sampling time stamp at a second sampling interval; and a communication unit configured for sending a second sampling signal including the sampling position and the corresponding sampling time stamp to a backend server.

Optionally, the second position sampling module is further configured for: when a user's trip ends, stopping the step of sampling the sampling position and the corresponding sampling time stamp at the second sampling interval. The vehicle further comprises a locking device for locking the vehicle when a user's trip ends and sending a locking signal including a locking time to the backend server.

Optionally, the vehicle further comprises: a vehicle movement detection unit configured for detecting and acquiring an average speed and a movement direction of the vehicle; and/or an alarm unit configured for generating an alarm signal and sending the alarm signal to the backend server.

According to the seventh aspect of the present invention, there is provided a vehicle positioning system comprising: a backend server provided by the fourth aspect of the present invention; a mobile communication device provided by the fifth aspect of the present invention; and a vehicle provided by the sixth aspect of the present invention.

The vehicle positioning method and system of the present invention can improve the vehicle positioning accuracy while reducing battery consumption.

The specific content of the present invention and the technical effect brought thereby will become clear through description of the description and the drawings below.

DETAILED DESCRIPTION OF VARIOUS EMBODIMENTS

The present invention is described with reference to some examples shown in the figures. To thoroughly understand the present invention, many details are omitted in the following description. However, those skilled in the art shall be clear that the present invention can be realized while omitting part or all of these details. In other cases, in order not to unnecessarily obscure the present invention, well known processing steps and/or structures are not specifically described. In addition, although the present invention is described with reference to certain examples, it should be understood that such description is not intended to limit the present invention within the described examples. On the contrary, such description is intended to encompass all substitutions, improvements and equivalent solutions within the spirit and scope of the present invention defined in the appended claims.

[Overall Structure of the Vehicle Positioning System]

Figure 1:
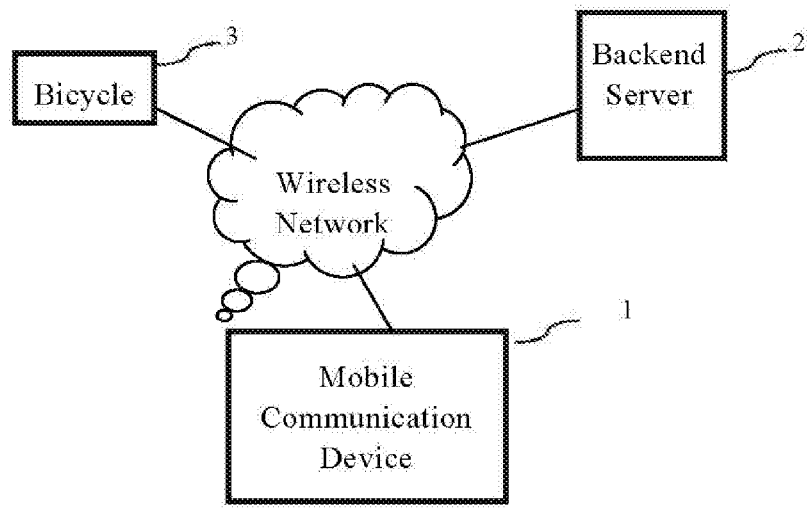
FIG. 1 is a schematic drawing of the overall structure of the vehicle positioning system of the present invention.

FIG. 1 is a schematic drawing of the overall structure of the vehicle positioning system of the present invention. As shown in FIG. 1, the system includes a mobile communication device 1, a backend server 2 and a bicycle 3, which can establish communication connections with one another via a wireless network. The bicycle 3 includes an anti-theft lock 30. Under control of a lock control unit 33, a locking signal and an anti-theft alarm signal can be sent to the backend server 2 via the wireless network. Here, the locking signal may include a locking time, so that the backend server 2 can know the locking time by receiving the locking signal. In addition, although the anti-theft lock 30 is exemplified as a locking device for the bicycle 3, the locking device is not limited to an anti-theft lock, and it can be any other device capable of locking the bicycle 3. The locking may be in any form, such as a mechanical form or an electronic form.

In addition, each of the mobile communication device 1 and the bicycle 3 is provided with a GPS module. In a case where a user's trip starts by the bicycle 3 and a GPS sampling function is started, the GPS modules can communicate with a GPS satellite at a certain fixed interval, so as to determine the position of the mobile communication device 1 or the bicycle 3, and reports the position and the time stamp to a backend server 2 when the position is determined. Further, the GPS modules of the mobile communication device 1 and the bicycle 3 will be in a dormant state when the user's trip ends, and will be awakened again when a next user's trip starts. Moreover, the GPS module of the bicycle 3 will be awakened if an anti-theft alarm is sent due to an external factor or locking needs to be executed manually by an operator as the user does not lock the bicycle.

The backend server 2 receives time stamps and sampling positions reported from the GPS modules of the mobile communication device 1 and the bicycle 3, respectively, and determines a specific position of the bicycle based on a locking time and other factors. The determination of the specific position of the bicycle will be described below.

In the present invention, the mobile communication device 1 may send or receive a signal via a wired or wireless network or other manners, or may process or store the signal, for example, in a memory in a physical storage state. Each mobile communication device 1 may be an electronic device that comprises hardware, software, or an embedded logic component or a combination of two or more such components, and is capable of executing appropriate functions implemented or supported by the mobile communication device. For example, the mobile communication device may be a smart phone, a tablet computer, a portable e-mail device, an electronic book, a handheld game machine and/or a game controller, a notebook computer, a netbook, a handheld electronic device, a smart wear device, and the like. The embodiments of the present invention cover any suitable mobile communication device. The mobile communication device may enable a user using the mobile communication device to access the network. In particular, the mobile communication device may comprise a processing device including an application processing unit and a radio frequency/digital signal processor, a display screen, a pocket keyboard that may include physical keys, touch keys covering the display screen or a combination thereof, a user identification module card, a memory device that may include a ROM, a RAM, a flash memory or any combination thereof, a Wi-Fi and/or Bluetooth interface, a wireless telephone interface, a power supply management circuit with an associated battery, a USB interface and connector, an audio management system with an associated microphone, speaker and headphone jack, and various optional accessories such as a digital camera, a global positioning system and an accelerator. In addition, various client applications may be installed on the mobile communication device, and may allow the mobile communication device to transmit commands suitable for being operated with other devices. Such applications may be downloaded from a server and installed into the memory of the mobile communication device, and may be previously installed on the mobile communication device. In the embodiments of the present invention, the mobile communication device 1 is provided with a bicycle user terminal application which can assist the user in realizing functions of managing the bicycle 3, wherein the functions include, but are not limited to, theft prevention. In other embodiments of the present invention, the mobile communication device 1 may also be provided with a maintenance personnel application that may be configured to assist the maintenance personnel in realizing functions of operational management for the bicycle 3, wherein the functions include, but are not limited to, theft prevention, maintenance and the like. According to some embodiments of the present invention, the mobile communication device 1 can obtain the position of the bicycle 3 by running a bicycle user terminal. Further, in a case where the bicycle 3 is stolen, the mobile communication device 1 will receive a prompt message from the backend server 2. In addition, the user may remotely unlock the bicycle 3 through the mobile communication device 1.

In the embodiments of the present invention, the backend server 2 is a server. The term "server" used herein should be understood as a service point for providing a processing function, a database and a communication facility. For example, the server may refer to a single physical processor with associated communication and data storage facilities and a database facility, or may refer to an aggregation of networked or grouped processors, associated networks and storage devices, and is configured for operating software and one or more database systems as well as application software supporting services provided by the server. The server may vary widely in configuration or performance, but may generally include one or more central processing units and a memory. The server may further include one or more mass memory devices, one or more power supplies, one or more wired or wireless network interfaces, one or more input/output interfaces, and one or more operating systems, such as Windows Server, Mac OS X, Unix, Linux, FreeBSD, and the like. In particular, the backend server may be an integral server or a distributed server across multiple computers or computer data centers. The server may be of various types, such as, a web server, a news server, a mail server, a message server, an advertisement server, a file server, an application server, an interactive server, a database server, or a proxy server, but is not limited thereto. In some embodiments, each server may include hardware, software, or an embedded logic component for performing appropriate functions supported or implemented by the server or a combination of two or more of the components. In the embodiments of the present invention, the server is configured to provide all functions necessary to support bicycle management. In the embodiments of the present invention, the backend server can calculate and determine whether a signal sent by an anti-theft lock is caused by a theft behavior or not. In addition, the backend server may send an instruction to the anti-theft lock to control it to/not to send an alarm; and the backend server may also send an instruction to the anti-theft lock to enable the anti-theft lock 30 to upload status information (e.g., positioning information) of the bicycle periodically or in real time.

In the embodiments of the present invention, the bicycle 3 is exemplified as a specific example of the vehicle. However, the bicycle is merely a representative example for describing specific contents of the embodiments of the present invention. The vehicle is not limited to a bicycle, and may be a tricycle, an electro-hybrid bicycle, a motorcycle, a four-wheel passenger car and the like as long as they are provided with GPS modules and may be communicated with the backend server. In the embodiments of the present invention, the vehicle may also be provided with a memory device and a processor device; the memory device may be configured to store an instruction; and the processor device may control the GPS module to acquire a signal according to the instruction, and trigger a communication with the backend server, so as to implement the steps related to the vehicle positioning method provided by the embodiment.

In the embodiments of the present invention, the wireless networks refer to any suitable wireless networks, such as, 4G networks, 3G networks, GPRS and Wi-Fi networks, but are not limited thereto. In addition, the wireless network through which the backend server 2 and the mobile communication device 1 are coupled together may be the same as or different from the wireless network through which the backend server 2 and the bicycle 3 are coupled together.

[Function Block View of the Vehicle Positioning System]

Figure 2:
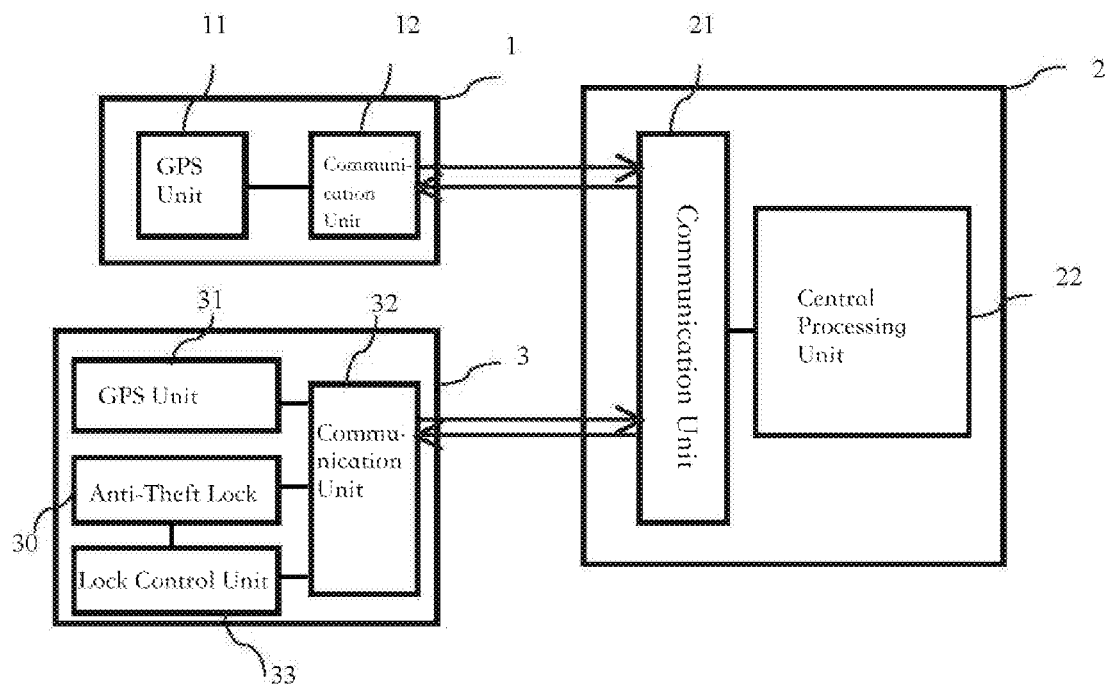
FIG. 2 is a function block view of the vehicle positioning system of the present invention.

FIG. 2 is a function block view of the overall structure of the vehicle positioning system according to an embodiment of the present invention.

As shown in FIG. 2, 1 represents a mobile communication device (hereinafter, sometimes referred to as a mobile phone for convenience) which is carried by a user of a bicycle. A GPS unit 11 (a first position sampling module) and a communication unit 12 are shown in the mobile communication device 1. A position of the mobile communication device 1 is sampled by the GPS unit 11 at a frequency of, for example, 5 seconds, and the position information is reported to the backend server 2 through the communication unit 12. Here, as the user of the bicycle 3 carries the mobile communication device 1, the position of the mobile communication device 1 is the same as that of the bicycle 3 during the user's riding, and the backend server 2 can determine the position of the bicycle 3 according to the position information reported by the mobile communication device 1. In addition, as an example, although it is described that the GPS unit 11 reports the position information at the frequency of 5 seconds herein, it should be noted that this is only an example for explaining the content of the embodiment of the present invention. Actually, the sampling frequency of the GPS unit 11 in the mobile communication device 1 can be arbitrarily set by a manufacturer of the GPS module or the mobile phone as required. In addition, for facilitating explanation, only functional blocks related to the embodiment of the present invention in the mobile communication device 1 are shown. But it will be understood by those skilled in the art that the mobile communication device 1 includes not only the above-described respective functional blocks but also various functional blocks in a common mobile phone, which is the same for other devices that will be described below.

In addition, as shown in FIG. 2, 3 represents a bicycle. The bicycle 3 comprises a GPS unit 31 (a second position sampling module), a communication unit 32, and a lock control unit 33. The GPS unit 31 in the bicycle 3 samples a position of the bicycle 3 at a certain frequency and reports the sampled position to a backend server 2 via the communication unit therein, which is the same as the GPS unit 11 in the mobile communication device 1. The GPS unit 31 in the bicycle 3 differs from the GPS unit 11 in the mobile communication device 1 in that a battery (not shown) arranged in the bicycle 3 is an auxiliary battery for providing power to the GPS unit 31 and the anti-theft lock 30. The battery capacity is very small due to the limitation of the size of the bicycle 3, so that the battery needs to be charged by recovering the energy during the travelling of the bicycle 3. Therefore, in order to minimize the battery consumption in the bicycle 3, the position sampling accuracy in the GPS unit 31 is greatly reduced, that is, the sampling frequency is much lower than that in the GPS unit 11; for example, it is several minutes or more than ten minutes. Although such sampling accuracy can satisfy the measurement of a general travelling route and a travelling distance of a vehicle, the accuracy is too low to acquire the position of the bicycle 3 accurately. It is for this reason that the inventors of the embodiments of the present invention are intended to assist in determining the position of the bicycle 3 by the GPS unit 11 in the mobile communication device 1, such as a mobile phone held by a bicycle user.

In addition, as shown in FIG. 2, 2 represents a backend server. The backend server 2 comprises a communication unit 21, which communicates with the mobile communication device 1 and the bicycle 3, and a central processing unit 22. The central processing unit 22 controls the whole backend server 2.

Figure 3:
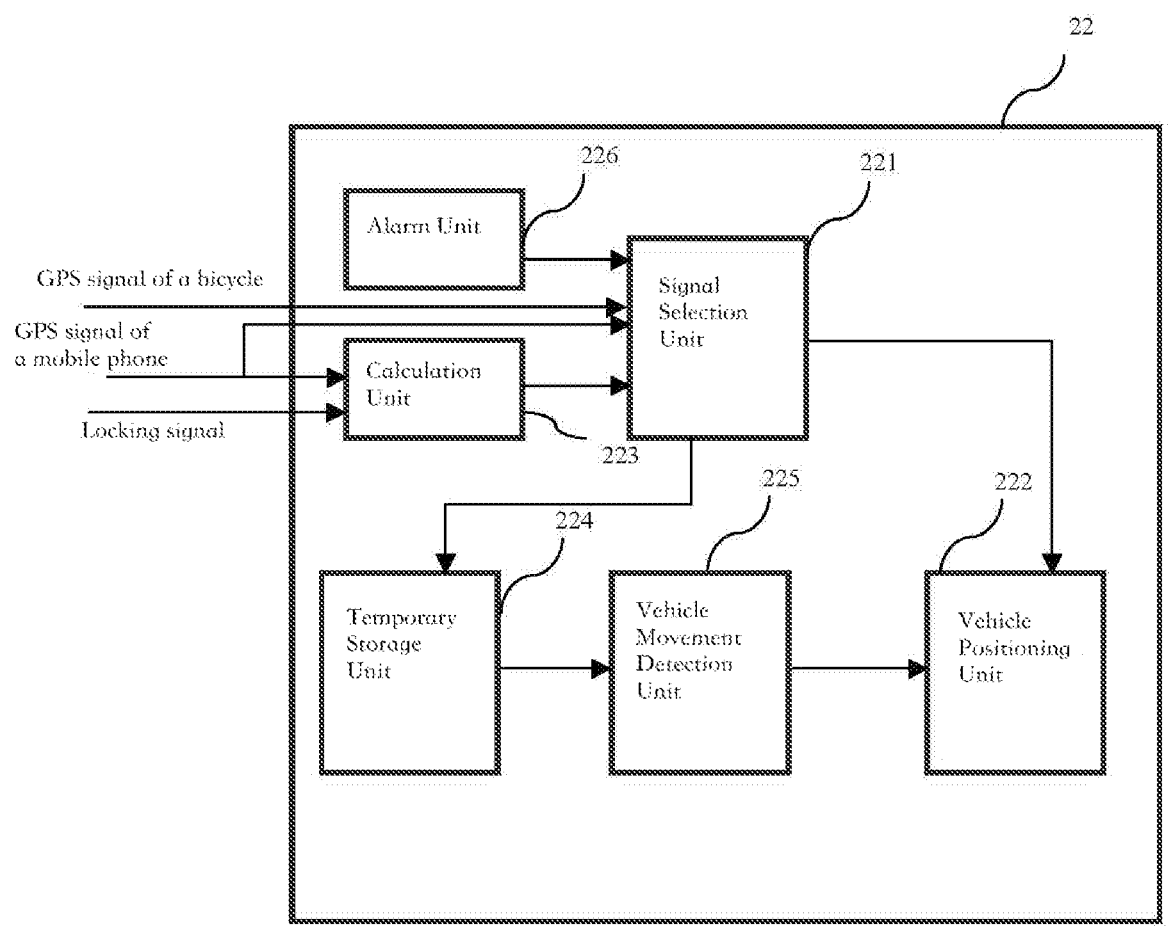
FIG. 3 is a function block view of a central processing unit 22 of a backend server 2 in the vehicle positioning system of the present invention.

Particularly, as shown in FIG. 3, the central processing unit 22 comprises a signal selection unit 221, a vehicle positioning unit 222, a calculation unit 223, a temporary storage unit 224, a vehicle movement detection unit 225 and an alarm unit 226.

First, a sampling signal from the GPS unit 11 and a locking signal from the anti-theft lock 30 are input to the calculation unit 223 via the communication unit 21, the calculation unit 223 extracts a locking time included in the locking signal and calculates a relation between the locking time and a sampling time stamp included in the sampling signal of the GPS unit 11. In addition, the sampling signals from the GPS unit 11 and the GPS unit 31 are input to the signal selection unit 221, and the signal selection unit 221 selects one of the two sampling signals based on a calculation result in the calculation unit 223 and a condition whether the alarm unit 226 sends an alarm signal or not. The signal selected by the signal selection unit 221 is input to the temporary storage unit 224 and the vehicle positioning unit 222, respectively. A sampling time stamp and a sampling position of each sampling point are temporarily stored in the temporary storage unit 224, so that the vehicle movement detection unit 225 can calculate an average speed and a movement direction of the bicycle based on the sampling time stamps and the sampling positions stored in the temporary storage unit 224. In addition, in the vehicle positioning unit 222, data of a sampled last sampling point is extracted from the GPS signal from the signal selection unit 221. Moreover, on the basis of a sampling position corresponding to the last sampling point, the sampling position is compensated based on an operation result of the vehicle movement detection unit 225; and the compensated position is taken as the final position of the vehicle. Further, the alarm unit 226 is described as being included in the central processing unit 22 at one side of the backend server 2 herein, but is not limited thereto in the present invention. The alarm unit 226 may be arranged in the bicycle or the mobile phone. The communication unit 21 in the backend server 2 receives the alarm signal from an alarm unit in the bicycle or the mobile phone and supplies the alarm signal to the signal selection unit 221.

In addition, as the sampling of the GPS unit is performed at a certain frequency, that is, there is a certain interval between sampling points, when the user's trip ends and the anti-theft lock 30 is locked, the locking time stamp is just between time stamps of two sampling points. Of course, it is possible that the locking time stamp is just at the time stamp of the last sampling point. That is, in a case where the sampling of the GPS unit is stopped as the user's trip ends, generally, there is also a certain distance from a position corresponding to the time stamp of the last sampling point of the GPS unit to a position corresponding to the time stamp of the anti-theft lock 30. Therefore, in the embodiments of the present invention, by arranging the vehicle movement detection unit 225, the average speed and the movement direction of the bicycle 3 are calculated in a trip in accordance with time stamps and sampling positions of the last two sampling points of the bicycle. Then, the vehicle position reported by the GPS unit is compensated in the vehicle positioning unit 222. That is, on the basis of the vehicle position reported by the GPS unit, the distance moved by the vehicle within a time difference between the last sampling time stamp and the locking time stamp is moved in the vehicle travelling direction, so that the compensated vehicle position is used as the final position of the vehicle. Here, the distance moved by the moving vehicle within the time difference between the last sampling time stamp and the locking time stamp is obtained by multiplying the average speed of the vehicle by the above time difference. In addition, since the vehicle speed will gradually slow down before the user parks and locks the vehicle, the above calculated average speed can be multiplied by a constant smaller than 1 as a corrected average speed.

In addition, in this embodiment, the vehicle movement detection unit 225 is arranged in the backend server 2, but it may be arranged on either the mobile communication device 1 or the bicycle 3, and information such as the calculated average speed and the movement direction is reported to the backend server 2 through the wireless network. Furthermore, in this embodiment, sampling data required by the vehicle movement detection unit 225 for performing calculation on the average speed and the movement direction is temporarily stored in the temporary storage unit 224 (for example, the buffer memory) arranged in the central processing unit 22 for calculation, and may be stored in a memory (e.g., a hard disk or internal memory) external to the central processing unit 22.

Furthermore, taking into the following considerations, the vehicle positioning unit 222 determines the position of the vehicle by using a signal selected by the signal selection unit 221 instead of always using the position reported by the GPS unit 11 herein. As described above, the GPS unit 11 in the mobile communication device 1 performs sampling on the vehicle position at a frequency of, for example, 5 seconds. Thus, it is considered that the GPS unit 11 normally ends the sampling in a case where a time difference, between the locking time stamp and the last sampling time stamp of the GPS unit 11, calculated by the calculation unit 223 is smaller than or equal to 5 seconds. Otherwise, if the time difference between the locking time stamp and the last sampling time stamp of the GPS unit 11 is greater than 5 seconds, it means that the GPS unit 11 ends sampling early due to a failure or the like, or the sampling function is not enabled at all, or the mobile phone has no signal. Therefore, in such cases, if the position reported by the GPS unit 11 continues as a current position of the bicycle, the positioning accuracy will be reduced. Thus, when it is determined that the GPS unit 11 is faulty, the vehicle positioning unit 222 adopts the signal reported by the GPS unit 31 and selected by the signal selection unit 221 to determine the position of the vehicle.

In addition, if the backend server 2 receives an alarm signal after the user's trip ends, the position of the vehicle may also be determined by using the signal reported by the GPS unit 31 and selected by the signal selection unit 221. This is because the received alarm signal herein comprises a received anti-theft alarm and a reported condition that it is required a bicycle manager to manually lock the bicycle as the user does not lock the bicycle. In such a case, as the user carrying the mobile phone has left the bicycle 3, the GPS unit 31 in the bicycle 3 is awakened from a sleep state by this alarm action. Thus, in this case, a relatively accurate vehicle position will be obtained by using the signal reported by the GPS unit 31 to determine the position of the vehicle.

[Flow Chart of Vehicle Positioning Method]

Figure 4:
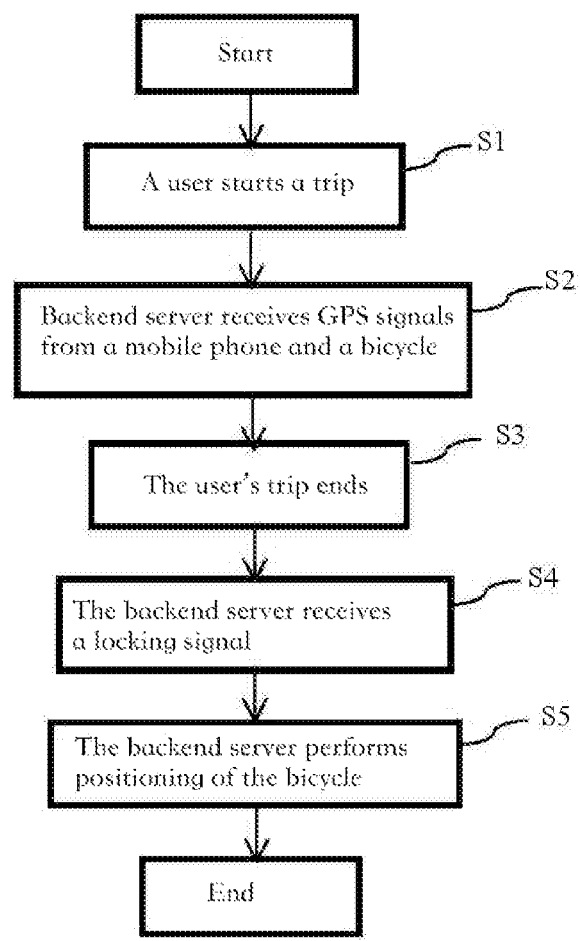
FIG. 4 is a flow chart of the vehicle positioning method of the present invention.

Hereinafter, the flow chart of the vehicle positioning method will be described based on FIGS. 4 and 5. In FIG. 4, first, when a user chooses to rent a bicycle, a user's trip starts by operating an application in a mobile phone (S1). In case that the user's trip starts, the GPS units in the mobile phone and the bicycle will be automatically started, respectively, so as to sample positions of the bicycle at a certain interval. At this time, the backend server 2 will continuously receive GPS signals from the mobile phone and the bicycle (S2). Of course, a storage device is arranged in the backend server 2, so that data obtained based on the GPS signal is allowed to establish association with the user information to be stored. After the user travels a certain distance or time by the bicycle and wants to end of the trip and return the bicycle, he/she operates the application in the mobile phone to end the trip (S3). When the user ends the trip, the GPS units in the mobile phone and the bicycle will stop sampling immediately and the anti-theft lock 30 will be locked at once. The anti-theft lock 30 sends a locking signal including the locking time to the backend server 2 while locking (S4). In the backend server 2, the bicycle is positioned based on the received sampling signal and the locking signal (S5).

Figure 5:
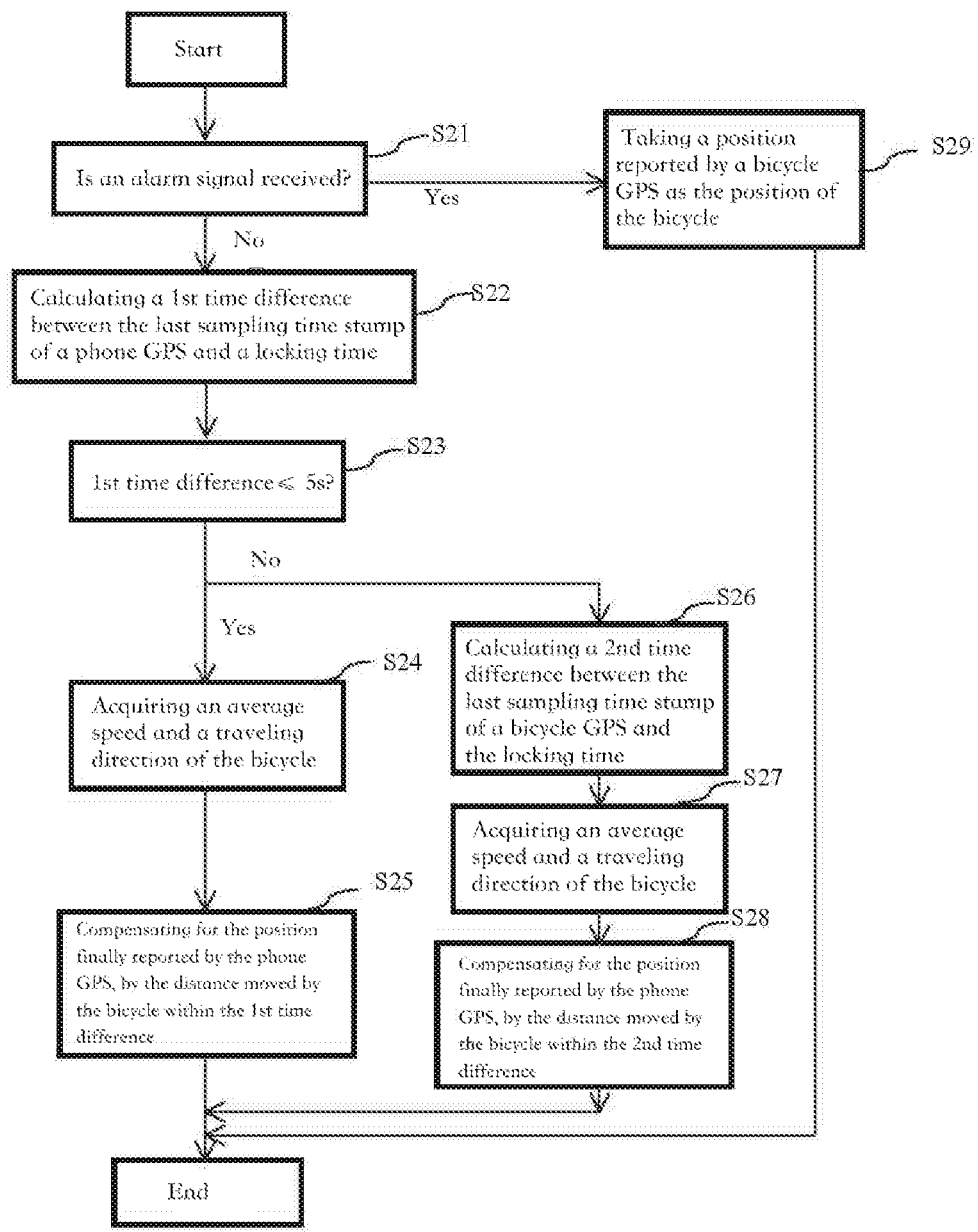
FIG. 5 is another flow chart of the vehicle positioning method of the present invention.

FIG. 5 shows a specific flow of step S5 for positioning the bicycle. First, after the user ends the trip, the backend server 2 judges whether an alarm signal is received or not (S21). Then, if the backend server 2 judges that the alarm signal is not received within a time period that the user's trip ends but a new trip is not started yet (In S21, "NO"), a first time difference between the last sampling time stamp and the locking time of the GPS unit 11 of the mobile phone is calculated (S22). When the first time difference is smaller than or equal to 5 s (In S23, "YES"), the backend server 2 acquires an average speed and a traveling direction of the bicycle 3 based on the GPS signal reported by the GPS unit 11 (S24). The position finally reported by the GPS unit 11 of the mobile phone is compensated by the distance moved by the bicycle 3 within the first time difference, and the compensated position is used as the position of the bicycle (S25). On the other hand, when the first time difference is greater than 5 s (In S23, "YES"), a second time difference between the last sampling time stamp and the locking time stamp of the GPS module 31 of the bicycle 3 is calculated (S26). Then, the backend server 2 acquires an average speed and a traveling direction of the bicycle 3 based on the GPS signal reported by the GPS unit 31 (S27). The position finally reported by the GPS unit 31 of the bicycle 3 is compensated by the distance moved by the bicycle 3 within the second time difference, and the compensated position is used as the position of the bicycle (S28). In addition, when the backend server 2 determines that an alarm signal is received (In S21, "YES"), the position reported by the GPS unit 31 of the bicycle 3 is used as the position of the bicycle (S29). It should be noted that in the embodiments of the present invention, as an example, it is judged whether the first time difference exceeds 5 s or not. However, the judgment criterion of 5 s is set based on the sampling interval (generally, it is set to be equal to the sampling interval) of the GPS unit 11 assumed in the above. Therefore, the judgment criterion varies depending on the specific situation of the sampling interval of the GPS unit 11, and the sampling interval can be flexibly set by users according to the actual needs.

Here, in order to obtain the accurate position of the bicycle, the positions reported by the GPS units in the mobile phone and the bicycle are respectively compensated in the backend server 2. However, in a case where it is not necessary to obtain a very accurate position or the average speed of the bicycle is slow enough, steps S24, S26 and S27 may be omitted; and in steps S25 and S28, the position reported by the GPS unit 11 or the GPS unit 31 is directly used as a current position of the bicycle.

EXAMPLE

Figure 6:
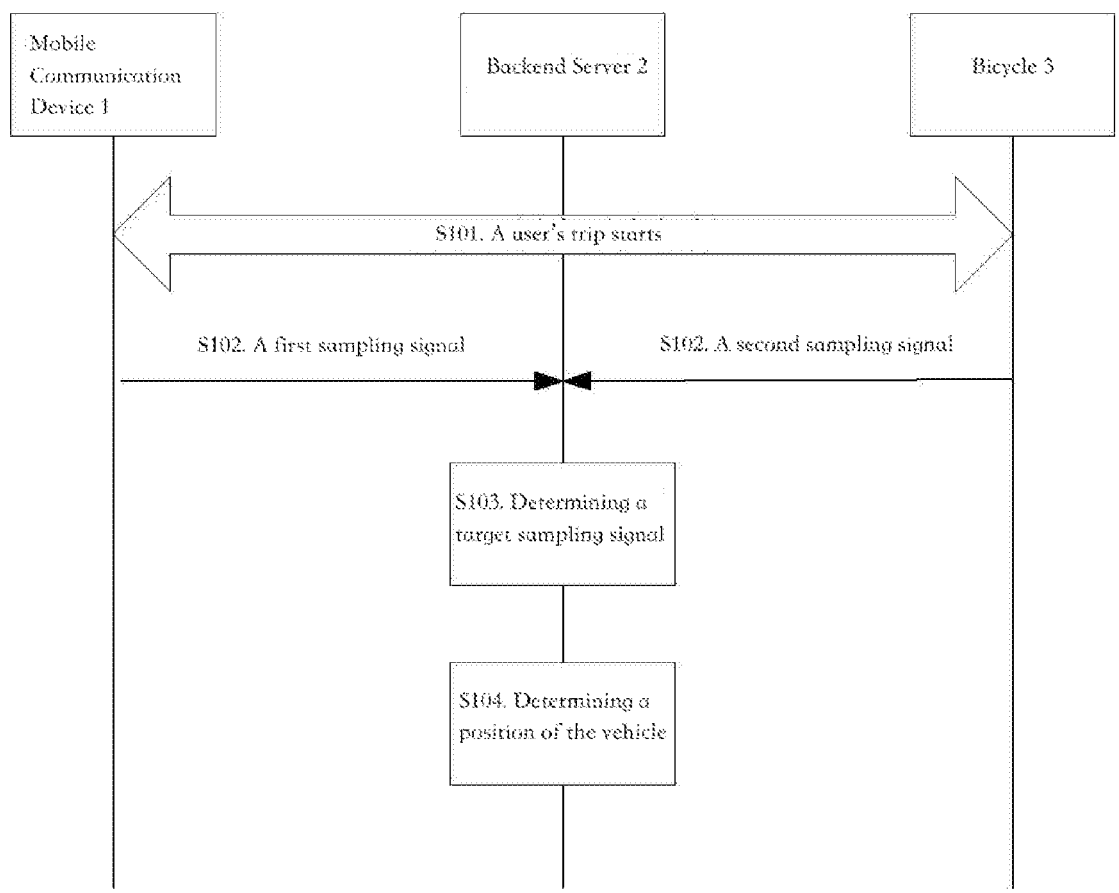
FIG. 6 is a schematic drawing of an example of the vehicle positioning method of the present invention.

The vehicle positioning method provided by the embodiments of the present invention will be further explained with reference to the example shown in FIG. 6.

In this example, the vehicle positioning method may be implemented by the vehicle positioning system shown in FIG. 1 or 2. Specifically, the vehicle positioning method is implemented by a mobile communication device 1, a backend server 2 and a bicycle 3. The method comprises the following steps.

In S101, a user operates an application of the mobile communication device 1, such that a trip is started by riding the bicycle 3.

During the trip, positions of the bicycle are sampled by the mobile communication device 1 and the bicycle 3.

In S102, the backend server 2 receives first sampling signals from the mobile communication device 1 and second sampling signals from the bicycle 3.

In S103, the backend server 2 selects a target sampling signal from the first and second sampling signals.

The steps of determining the target sampling signal can be executed by the signal selection unit 221 shown in FIG. 2. The implementation manner has been explained in the description for FIG. 2, and will not be repeated.

In S104, the position of the bicycle 3 is determined based on the target sampling signal.

The steps for determining the position of the vehicle are shown in FIG. 5 and will not be repeated.

The above has explained the vehicle positioning method provided by the embodiments of the present invention with reference to the drawings and the above example. By receiving a first sampling signal from a mobile communication device and a second sampling signal from a vehicle, selecting a target sampling signal from the first and second sampling signals, and determining a position of the vehicle based on the target sampling signal, the vehicle positioning method can improve the vehicle positioning accuracy while reducing battery consumption.

According to the first aspect of the present invention, there is provided a vehicle positioning method applied to a vehicle positioning system which comprises a mobile communication device, a vehicle and a backend server, the method being executed by the backend server and comprising: receiving a first sampling signal from the mobile communication device and a second sampling signal from the vehicle, the first sampling signal including a sampling position and a corresponding sampling time stamp sampled at a first sampling interval, and the second sampling signal including a sampling position and a corresponding sampling time stamp sampled at a second sampling interval; selecting a target sampling signal from the first and second sampling signals; and determining a position of the vehicle based on the target sampling signal.

According to the second aspect of the present invention, in the method of the first aspect, selecting the target sampling signal comprises selecting a sampling signal corresponding to a smaller sampling interval in the first and second sampling intervals as the target sampling signal; and determining the position of the vehicle comprises determining the sampling position corresponding to the last sampling time stamp in the target sampling signals as the position of the vehicle.

According to the third aspect of the present invention, the method of the first or second aspect further comprises: receiving a locking signal including a locking time from the vehicle, wherein selecting the target sampling signal comprises: calculating a first time difference between the locking time and the last sampling time stamp in the first sampling signals; when determining that the first time difference is not greater than a preset time, selecting the first sampling signal as the target sampling signal, otherwise, selecting the second sampling signal as the target sampling signal; and determining the position of the vehicle comprises determining the sampling position corresponding to the last sampling time stamp in the target sampling signals as the position of the vehicle.

According to the fourth aspect of the present invention, in the method of any of the first to third aspects, the preset time is the first sampling interval.

According to the fifth aspect of the present invention, the method of any of the first to fourth aspects further comprises: detecting and acquiring an average speed and a movement direction of the vehicle, and/or receiving an average speed and a movement direction of the vehicle sent by the mobile communication device or the vehicle; and based on the average speed and the movement direction of the vehicle, compensating for the position of the vehicle to obtain a final position thereof.

According to the sixth aspect of the present invention, in the method of any of the first to fifth aspects, compensating for the position of the vehicle to obtain a final position thereof comprises: when the target sampling signal is the first sampling signal, calculating a product of the first time difference and the average speed to obtain a movement distance, and taking a position obtained by moving the sampling position corresponding to the last sampling time stamp in the first sampling signals by the movement distance in the movement direction, as the final position of the vehicle; when the target sampling signal is the second sampling signal, calculating and acquiring a second time difference between the locking time and the last sampling time stamp in the second sampling signals, calculating a product of the second time difference and the average speed to obtain a movement distance, and taking a position obtained by moving the sampling position corresponding to the last sampling time stamp in the second sampling signals by the movement distance in the movement direction, as the final position of the vehicle.

According to the seventh aspect of the present invention, the method of any of the first to sixth aspects further comprises: generating an alarm signal, and/or receiving an alarm signal sent by the mobile communication device or the vehicle, wherein selecting the target sampling signal comprises selecting the second sampling signal as the target sampling signal; and determining the position of the vehicle comprises determining the sampling position corresponding to the last sampling time stamp in the second sampling signals as the position of the vehicle.

According to the eighth aspect of the present invention, there is provided a vehicle positioning method applied to a vehicle positioning system which comprises a mobile communication device, a vehicle and a backend server, the method being executed by the mobile communication device and comprising: sampling a sampling position and a corresponding sampling time stamp at a first sampling interval; and sending a first sampling signal including the sampling position and the corresponding sampling time stamp to the backend server.

According to the ninth aspect of the present invention, the method of the eighth aspect further comprises: when a user's trip ends, stopping the step of sampling the sampling position and the corresponding sampling time stamp at the first sampling interval.

According to the tenth aspect of the present invention, the method of the eighth or ninth aspect further comprises: detecting and acquiring an average speed and a movement direction of the vehicle, and sending the average speed and the movement direction of the vehicle to the backend server; and/or generating an alarm signal, and sending the alarm signal to the backend server.

According to the eleventh aspect of the present invention, there is provided a vehicle positioning method applied to a vehicle positioning system which comprises a mobile communication device, a vehicle and a backend server, the method being executed by the vehicle and comprising: sampling a sampling position and a corresponding sampling time stamp at a second sampling interval; and sending a second sampling signal including the sampling position and the corresponding sampling time stamp to the backend server.

According to the twelfth aspect of the present invention, the method of the eleventh aspect further comprises: when a user's trip ends, stopping the step of sampling the sampling position and the corresponding sampling time stamp at the second sampling interval; locking the vehicle, and sending to the backend server a locking signal including a locking time.

According to the thirteenth aspect of the present invention, the method of the eleventh or twelfth aspect further comprises: detecting and acquiring an average speed and a movement direction of the vehicle, and sending the average speed and the movement direction of the vehicle to the backend server; and/or generating an alarm signal, and sending the alarm signal to the backend server.

According to the fourteenth aspect of the present invention, there is provided a backend server for executing a vehicle positioning method applied to a vehicle positioning system. The backend server comprises: a communication unit configured for receiving a first sampling signal from the mobile communication device and a second sampling signal from the vehicle, the first sampling signal including a sampling position and a corresponding sampling time stamp sampled at a first sampling interval, and the second sampling signal including a sampling position and a corresponding sampling time stamp sampled at a second sampling interval; a signal selection unit configured for selecting a target sampling signal from the first and second sampling signals; and a vehicle positioning unit configured for determining a position of the vehicle based on the target sampling signal.

According to the fifteenth aspect of the present invention, in the backend server according to the fourteenth aspect, the signal selection unit is configured for selecting a sampling signal corresponding to a smaller sampling interval in the first and second sampling intervals as the target sampling signal; and the vehicle positioning unit is configured for determining the sampling position corresponding to the last sampling time stamp in the target sampling signals as the position of the vehicle.

According to the sixteenth aspect of the present invention, in the backend server according to the fourteenth or fifteenth aspect, the communication unit is further configured for receiving a locking signal including a locking time from the vehicle. The backend server further comprises: a calculation unit configured for calculating a first time difference between the locking time and the last sampling time stamp in the first sampling signals. The signal selection unit is configured for, when determining that the first time difference is not greater than a preset time, selecting the first sampling signal as the target sampling signal, otherwise, selecting the second sampling signal as the target sampling signal. The vehicle positioning unit is configured for determining the sampling position corresponding to the last sampling time stamp in the target sampling signals as the position of the vehicle.

According to the seventeenth aspect of the present invention, the backend server of any of the fourteenth to sixteenth aspect further comprises: a vehicle movement detection unit configured for detecting and acquiring an average speed and a movement direction of the vehicle, and/or the communication unit is configured for receiving an average speed and a movement direction of the vehicle sent by the mobile communication device or the vehicle; and the vehicle positioning unit is configured for, based on the average speed and the movement direction of the vehicle, compensating for the position of the vehicle to obtain a final position thereof.

According to the eighteenth aspect of the present invention, in the backend server of any of the fourteenth to seventeenth aspect, when the target sampling signal is the first sampling signal, the vehicle positioning unit is configured for: calculating a product of the first time difference and the average speed to obtain a movement distance, and taking a position obtained by moving the sampling position corresponding to the last sampling time stamp in the first sampling signals by the movement distance in the movement direction, as the final position of the vehicle. When the target sampling signal is the second sampling signal, the calculation unit is configured for calculating and acquiring a second time difference between the locking time and the last sampling time stamp in the second sampling signals; and the vehicle positioning unit is configured for: calculating a product of the second time difference and the average speed to obtain a movement distance, and taking a position obtained by moving the sampling position corresponding to the last sampling time stamp in the second sampling signals by the movement distance in the movement direction, as the final position of the vehicle.

According to the nineteenth aspect of the present invention, the backend server of any of the fourteenth to eighteenth aspect further comprises: an alarm unit configured for generating an alarm signal, and/or the communication unit is further configured for receiving an alarm signal sent by the mobile communication device or the vehicle. The signal selection unit is further configured for selecting the second sampling signal as the target sampling signal; and the vehicle positioning unit is configured for determining the sampling position corresponding to the last sampling time stamp in the second sampling signals as the position of the vehicle.

According to the twentieth aspect of the present invention, there is provided a mobile communication device for executing a vehicle positioning method applied to a vehicle positioning system. The mobile communication device comprises: a first position sampling module configured for sampling a sampling position and a corresponding sampling time stamp at a first sampling interval; and a communication unit configured for sending a first sampling signal including the sampling position and the corresponding sampling time stamp to a backend server.

According to the twenty first aspect of the present invention, in the mobile communication device according to the twentieth aspect of the present invention, the first position sampling module is further configured for: when a user's trip ends, stopping the step of sampling the sampling position and the corresponding sampling time stamp at the first sampling interval.

According to the twenty second aspect of the present invention, the mobile communication device according to the twentieth or twenty first aspect of the present invention further comprises: a vehicle movement detection unit configured for detecting and acquiring an average speed and a movement direction of a vehicle; and/or an alarm unit configured for generating an alarm signal and sending the alarm signal to a backend server.

According to the twenty third aspect of the present invention, there is provided a vehicle for executing a vehicle positioning method applied to a vehicle positioning system. The vehicle comprises: a second position sampling module configured for sampling a sampling position and a corresponding sampling time stamp at a second sampling interval; and a communication unit configured for sending a second sampling signal including the sampling position and the corresponding sampling time stamp to a backend server.

According to the twenty fourth aspect of the present invention, in the vehicle according to the twenty third aspect, the second position sampling module is further configured for: when a user's trip ends, stopping the step of sampling the sampling position and the corresponding sampling time stamp at the second sampling interval. The vehicle further comprises a locking device for locking the vehicle when a user's trip ends and sending a locking signal including a locking time to the backend server.

According to the twenty fifth aspect of the present invention, the vehicle according to the twenty third or twenty fourth aspect further comprises: a vehicle movement detection unit configured for detecting and acquiring an average speed and a movement direction of the vehicle; and/or an alarm unit configured for generating an alarm signal and sending the alarm signal to the backend server.

According to the twenty sixth aspect of the present invention, there is provided a vehicle positioning system comprising: a backend server provided by any of the fourteenth to nineteenth aspects of the present invention; a mobile communication device provided by any of the twentieth to twenty second aspects of the present invention; and a vehicle provided by any of the twenty third to twenty fifth aspects of the present invention.

The present invention may be a system, a method and/or a computer program product. The computer program product may include a computer-readable storage medium loaded with computer-readable program instructions causing a processor to realize the aspects of the present invention.

The computer-readable storage medium may be a physical device that may maintain and store instructions used by an instruction-executable device. For example, the computer-readable storage medium may be, but is not limited to, an electric storage device, a magnetic storage device, an optical storage device, an electromagnetic storage device, a semiconductor storage device, or any suitable combination thereof. More specific examples (non-exhaustive lists) of the computer-readable storage medium include a portable computer disk, a hard disk, a random access memory (RAM), a read-only memory (ROM), an erasable programmable read-only memory (EPROM or a flash memory), a static random access memory (SRAM), a portable compact disk read-only memory (CD-ROM), a digital versatile disc (DVD), a memory stick, a floppy disk, a mechanical encoding device, a punched card or a groove bulged structure that stores instructions thereon, and any suitable combination thereof. The computer-readable storage medium used herein is not interpreted as an instantaneous signal, such as radio waves or other freely propagated electromagnetic waves, electromagnetic waves propagated through a waveguide or other transmission media (e.g., optical pulses of optical fiber cables), or electrical signals transmitted by wires.

The computer-readable program instructions described herein may be downloaded from a computer-readable storage medium to respective computing/processing devices or downloaded to an external computer or external storage device via a network, such as the Internet, a local area network, a wide area network and/or a wireless network. The network may include copper transmission cables, optical fiber transmission, wireless transmission, a router, a firewall, a switch, a gateway computer and/or an edge server. A network adapter card or network interface in each computing/processing device receives computer-readable program instructions from the network and forwards the computer-readable program instructions to be stored in the computer-readable storage medium in each computing/processing device.

The computer-readable program instructions for executing the operations of the present invention may be assembly instructions, instruction set architecture (ISA) instructions, machine instructions, machine-related instructions, microcodes, firmware instructions, state setting data, or source codes or object codes written by any combination of one or more programming languages. The programming languages include object-oriented programming languages, such as Smalltalk, C++ and the like, as well as conventional procedural programming languages, such as "C" language or similar programming languages. The computer-readable program instructions may be completely executed on a user's computer, partially executed on the user's computer, executed as a separate software package, executed on the user's computer and a remote computer, or completely executed on the remote computer or a server. When the remote computer is referred to, the remote computer may be connected to a user computer via any kind of network, including a local area network (LAN) or a wide area network (WAN), or may be connected to an external computer (e.g., via the Internet provided by an Internet service provider). In some embodiments, an electronic circuit, such as a programmable logic circuit, a field programmable gate array (FPGA) or a programmable logic array (PLA) is customized in a personalized manner by utilizing state information of the computer-readable program instructions. The electronic circuit may execute the computer-readable program instructions, implementing various aspects of the present invention.

Various aspects of the present invention are described herein with reference to flow charts and/or block diagrams of the method, device (system) and computer program product according to the embodiments of the present invention. It should be understood that flow charts and/or each block in the block diagrams, as well as the flow charts and/or the combinations of all blocks in the block diagrams, may be implemented by computer-readable program instructions.

These computer-readable program instructions may be provided to a processor of a general purpose computer, a special purpose computer, or other programmable data processing devices to generate a machine, so that when these instructions are executed by the processor of the computer or the other programmable data processing devices, a device for realizing functions/actions designated in the flow charts and/or in one or more blocks in the block diagrams. These computer-readable program instructions may also be stored in a computer-readable storage medium that causes the computer, the programmable data processing device and/or other devices to operate in a particular manner. Thus, the computer-readable medium stored with the instructions includes a manufacture that includes instructions for realizing functions/actions designated in the flow charts and/or in one or more blocks in the block diagrams.

These computer program instructions may further be loaded into a computer or other programmable data processing devices or other devices, such that a series of operating steps may be performed on the computer or other programmable data processing devices or other devices, so as to generate processes realized by the computer, and functions/actions for realizing the functions designated in one or more processes in the flowcharts and/or in one or more blocks in the block diagrams may be provided by the instructions executed on the computer or other programmable data processing devices or other devices.

The flowcharts and block views in the accompanying drawings show the structures, functions and operations that may be realized by the systems, methods and computer program products of this invention. Each block in the flowcharts and block views may represent one module, one program segment or a part of instructions, which comprise(s) one or more executable instructions for realizing predetermined logical functions. It should also be noted that in some alternative implementations, the function described in one block may be realized in a sequence difference from that described in the drawings. For example, two consecutive blocks may be executed substantially in parallel, and may be executed in an inverse sequence, depending on the related functions. It should be noted that each block or a combination of the blocks in the flowcharts and/or block views may be realized by specific software systems for executing predetermined functions or operations, or by a combination of specific hardware and computer instructions. Those skilled in the art should well know that the realization manners by hardware, or software or a combination thereof are all equivalents.

The above has described the embodiments of this invention. But the above descriptions are only exemplary rather than exhaustive, and are not intended to limit the disclosed embodiments. Those skilled in the art should clearly understand that modifications can be made to the above embodiments without departing from the scope and spirit of the embodiments of this invention. The terms selected in this disclosure are intended to best explain the principles of the embodiments, applications or improvements to the existing technologies, or to enable those skilled in the art/related arts to better understand the embodiments of this invention. The scope of this invention is defined by the appended claims.

The invention claimed is:

1. A rental vehicle positioning method for a rental vehicle positioning system which comprises a mobile communication device, a bicycle, and a backend server, a position of the mobile communication device being the same as that of the bicycle during riding of the bicycle by a user carrying the mobile communication device, the method being executed by the backend server and comprising the steps of:
   receiving a first sampling signal from the mobile communication device and a second sampling signal from the bicycle, wherein the first sampling signal includes a sampling position and a corresponding sampling time stamp sampled at a first sampling interval, the second sampling signal including a sampling position and a corresponding sampling time stamp sampled at a second sampling interval, and the second sampling interval being larger than the first sampling interval;
   selecting a target sampling signal from the first and second sampling signals; and
   determining a position of the bicycle based on the target sampling signal.

2. The method according to claim 1, wherein:
   the selecting the target sampling signal comprises selecting a sampling signal corresponding to a smaller sampling interval in the first and second sampling intervals as the target sampling signal; and
   determining the position of the bicycle comprises determining the sampling position corresponding to the last sampling time stamp in the target sampling signals as the position of the bicycle.

3. The method according to claim 1, wherein:
   the method further comprises the step of receiving a locking signal including a locking time from the bicycle;
   the selecting the target sampling signal comprises:
      calculating a first time difference between the locking time and the last sampling time stamp in the first sampling signals, and
      when determining that the first time difference is not greater than a preset time, selecting the first sampling signal as the target sampling signal, otherwise, selecting the second sampling signal as the target sampling signal; and
   the determining the position of the bicycle comprises determining the sampling position corresponding to the last sampling time stamp in the target sampling signals as the position of the bicycle.

4. The method according to claim 3, wherein the preset time is the first sampling interval.

5. The method according to claim 1, wherein the method further comprises the steps of:
   detecting and acquiring an average speed and a movement direction of the bicycle, and/or receiving an average speed and a movement direction of the bicycle sent by the mobile communication device or the bicycle; and
   based on the average speed and the movement direction of the bicycle, compensating for the position of the bicycle to obtain a final position of the bicycle.

6. The method according to claim 5, wherein the compensating for the position of the bicycle to obtain a final position thereof comprises:
   when the target sampling signal is the first sampling signal, calculating a product of the first time difference and the average speed to obtain a movement distance, and taking a position obtained by moving the sampling position corresponding to the last sampling time stamp in the first sampling signals by the movement distance in the movement direction, as the final position of the bicycle; and
   when the target sampling signal is the second sampling signal, calculating and acquiring a second time difference between the locking time and the last sampling time stamp in the second sampling signals, calculating a product of the second time difference and the average speed to obtain a movement distance, and taking a position obtained by moving the sampling position corresponding to the last sampling time stamp in the second sampling signals by the movement distance in the movement direction, as the final position of the v bicycle.

7. The method according to claim 1, wherein:
   the method further comprises the step of at least one of generating an alarm signal or receiving an alarm signal sent by the mobile communication device or the bicycle;
   the selecting the target sampling signal comprises selecting the second sampling signal as the target sampling signal; and
   the determining the position of the bicycle comprises determining the sampling position corresponding to the last sampling time stamp in the second sampling signals as the position of the bicycle.

8. A backend server, comprising:
   a memory for storing instructions; and
   a processor for performing the rental vehicle positioning method according to claim 1 under control of the instructions.

9. A rental vehicle positioning system comprising:
   a backend server according to claim 8;
   a mobile communication device; and
   a bicycle.

* * * * *